(12) United States Patent
Obayashi et al.

(10) Patent No.: US 12,015,141 B2
(45) Date of Patent: Jun. 18, 2024

(54) NON-AQUEOUS ELECTROLYTE SECONDARY BATTERY

(71) Applicant: PRIME PLANET ENERGY & SOLUTIONS, INC., Tokyo (JP)

(72) Inventors: Atsushi Obayashi, Sumoto (JP); Hikaru Yoshida, Ibaraki (JP)

(73) Assignee: Prime Planet Energy & Solutions, Inc., Tokyo (JP)

( * ) Notice: Subject to any disclaimer, the term of this patent is extended or adjusted under 35 U.S.C. 154(b) by 0 days.

(21) Appl. No.: 17/484,070

(22) Filed: Sep. 24, 2021

(65) Prior Publication Data

US 2022/0131132 A1   Apr. 28, 2022

(30) Foreign Application Priority Data

Oct. 26, 2020   (JP) .................................. 2020-178748

(51) Int. Cl.
*H01M 4/139*   (2010.01)
*H01M 4/02*   (2006.01)
(Continued)

(52) U.S. Cl.
CPC ........... *H01M 4/139* (2013.01); *H01M 4/049* (2013.01); *H01M 10/05* (2013.01); *H01M 2004/021* (2013.01); *H01M 2004/027* (2013.01)

(58) Field of Classification Search
CPC .... H01M 4/0404; H01M 4/049; H01M 4/139; H01M 10/05; H01M 2004/021; H01M 2004/027
See application file for complete search history.

(56) References Cited

U.S. PATENT DOCUMENTS

| 2004/0214085 A1 | 10/2004 | Sheem et al. |
| 2014/0255741 A1 | 9/2014 | Kwon et al. |

(Continued)

FOREIGN PATENT DOCUMENTS

| CN | 101399333 A | 4/2009 |
| CN | 111295784 A | 6/2020 |

(Continued)

OTHER PUBLICATIONS

JP-2016058343-A Machine Translation. (Year: 2016).*
JP-2011204571-A Machine Translation. (Year: 2011).*

*Primary Examiner* — Matthew T Martin
*Assistant Examiner* — Ankith R Sripathi
(74) *Attorney, Agent, or Firm* — Finnegan, Henderson, Farabow, Garrett & Dunner, LLP

(57) ABSTRACT

A non-aqueous electrolyte secondary battery comprises a positive electrode, a negative electrode, a separator, and an electrolyte solution. At least part of the separator is interposed between the positive electrode and the negative electrode. The negative electrode includes a negative electrode substrate and a negative electrode active material layer. The negative electrode active material layer is placed on a surface of the negative electrode substrate. Voids are formed in the negative electrode active material layer. In a cross section parallel to a thickness direction of the negative electrode active material layer, the voids have an average equivalent circle diameter from 9.6 μm to 35.8 μm, an average circularity of 0.26 or more, and an area percentage from 3.1% to 30.9%.

10 Claims, 5 Drawing Sheets

(51) Int. Cl.
*H01M 4/04* (2006.01)
*H01M 10/05* (2010.01)

(56) References Cited

U.S. PATENT DOCUMENTS

| | | | |
|---|---|---|---|
| 2015/0155547 A1* | 6/2015 | Tenzer | H01M 4/38 429/231.1 |
| 2017/0346079 A1 | 11/2017 | Friend et al. | |
| 2021/0135223 A1 | 5/2021 | Sata et al. | |
| 2022/0131123 A1* | 4/2022 | Yoshida | H01M 4/0416 |

FOREIGN PATENT DOCUMENTS

| | | |
|---|---|---|
| EP | 2 770 559 A1 | 8/2014 |
| EP | 3 231 027 A1 | 10/2017 |
| JP | 2000-123827 A | 4/2000 |
| JP | 2011204571 A * | 10/2011 |
| JP | 2016058343 A * | 4/2016 |
| JP | 2016-184484 A | 10/2016 |
| KR | 10 2014-0076516 A | 6/2014 |
| KR | 10 2017-0118044 A | 10/2017 |

* cited by examiner

NON-AQUEOUS ELECTROLYTE SECONDARY BATTERY

This nonprovisional application is based on Japanese Patent Application No. 2020-178748 filed on Oct. 26, 2020, with the Japan Patent Office, the entire contents of which are hereby incorporated by reference.

BACKGROUND OF THE INVENTION

Field of the Invention

The present disclosure relates to a non-aqueous electrolyte secondary battery.

Description of the Background Art

Japanese Patent Laying-Open No. 2000-123827 discloses a negative electrode consisting of a porous body.

SUMMARY OF THE INVENTION

There is a demand for decreasing chemically-occurring micro short circuits in non-aqueous electrolyte secondary batteries (which may be simply called "battery" hereinafter). It is considered that a chemically-occurring micro short circuit occurs by the mechanism described below.

During battery production, a metal fragment can be trapped in the positive electrode. The metal fragment is oxidized due to the high electric potential of the positive electrode, and then the metal ions thus generated are dissolved in the electrolyte solution. The metal ions migrate to the negative electrode. At the negative electrode, the metal ions are reduced to become solid, and then deposited. The metal thus deposited on the negative electrode grows toward the positive electrode, and, as a result, a micro short circuit can occur.

An object of the present disclosure is to decrease chemically-occurring micro short circuits.

Hereinafter, the technical configuration and effects of the present disclosure will be described. It should be noted that the action mechanism according to the present disclosure includes presumption. The scope of claims should not be limited by whether or not the action mechanism is correct.

[1] A non-aqueous electrolyte secondary battery comprises a positive electrode, a negative electrode, a separator, and an electrolyte solution. At least part of the separator is interposed between the positive electrode and the negative electrode. The negative electrode includes a negative electrode substrate and a negative electrode active material layer. The negative electrode active material layer is placed on a surface of the negative electrode substrate. Voids are formed in the negative electrode active material layer. In a cross section parallel to a thickness direction of the negative electrode active material layer, the voids have an average equivalent circle diameter from 9.6 µm to 35.8 µm, an average circularity of 0.26 or more, and an area percentage from 3.1% to 30.9%.

The negative electrode active material layer includes a negative electrode active material. Generally, a negative electrode active material is powder (particles). Gaps between the particles are not completely filled, and therefore a negative electrode active material layer is porous. Conventionally, formation of voids in a negative electrode active material layer is left to its natural course. The compression rate (that is, the density) of the negative electrode active material layer may be controlled to exert some degree, but not enough, of control over the porosity.

According to a novel finding of the present disclosure, by controlling the size, shape, and amount of the voids in the negative electrode active material layer to make them fit within particular ranges, it is possible to decrease chemically-occurring micro short circuits. More specifically, in a cross section of the negative electrode active material layer according to the present disclosure, the voids have an average equivalent circle diameter from 9.6 µm to 35.8 µm, an average circularity of 0.26 or more, and, an area percentage from 3.1% to 30.9%. When all of these conditions are satisfied, chemically-occurring micro short circuits tend to be decreased. It may be because metal is deposited inside the voids and therefore tends not to grow toward the positive electrode.

Formation of the voids according to the present disclosure may not be accomplished when it is merely left to its natural course. In the present disclosure, a void-forming aid may be used, for example. The void-forming aid may be microcapsules and/or the like, for example. For example, microcapsules are mixed in the negative electrode active material layer. During battery production, the microcapsules burst and shrink. Thus, voids may be formed. Changing the size, shape, amount, and the like of the microcapsules may make it possible to control the average equivalent circle diameter, the average circularity, and the area percentage of the voids.

[2] The voids may have an area percentage of 25.2% or less, for example.

When the voids have an area percentage of 25.2% or less, an increase of the thickness of the negative electrode active material layer during charging tends to be decreased.

[3] In the cross section parallel to the thickness direction of the negative electrode active material layer, the negative electrode active material layer is divided into two equal parts in the thickness direction, and thus the negative electrode active material layer is separated into a first region and a second region. The first region includes a surface of the negative electrode active material layer. The second region includes an interface between the negative electrode active material layer and the negative electrode substrate. The voids may be formed at least in the first region.

Metal tends to be deposited on a surface portion of the negative electrode active material layer. The first region according to [3] above includes a surface portion of the negative electrode active material layer. Because the voids according to the present disclosure are formed at least in the first region, chemically-occurring micro short circuits are expected to be decreased with high efficiency.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Next, an embodiment of the present disclosure (also called "the present embodiment" hereinafter) will be described. It should be noted that the below description does not limit the scope of claims.

Any geometric term in the present specification (such as "parallel", for example) should not be interpreted solely in its exact meaning. For example, "parallel" may mean a geometric state that is deviated, to some extent, from exact "parallel". Any geometric term in the present specification may include tolerances and/or errors in terms of design, operation, production, and/or the like.

In the present specification, a numerical range such as "from 9.6 µm to 35.8 µm" includes both the upper limit and the lower limit, unless otherwise specified. For example, "from 9.6 µm to 35.8 µm" means a numerical range of "not less than 9.6 µm and not more than 35.8 µm". Moreover, any numerical value selected from the numerical range may be used as a new upper limit and/or a new lower limit. For example, any numerical value described in Examples and any numerical value within the numerical range may be combined to create a new numerical range.

In the present specification, when a compound is represented by a stoichiometric composition formula such as "$LiCoO_2$", this stoichiometric composition formula is merely a typical example. For example, when lithium cobalt oxide is represented as "$LiCoO_2$", the composition ratio of lithium cobalt oxide is not limited to "Li/Co/O=1/1/2" but Li, Co, and O may be included in any composition ratio, unless otherwise specified. The composition ratio may be non-stoichiometric.

In the present specification, the expression "consist essentially of" means a concept between "consist of" and "comprise". The expression "consist essentially of" means that an additional component may also be included in addition to an essential component or components, unless an object of the present disclosure is impaired. For example, a component that is usually expected to be included in the relevant technical field (such as impurities, for example) may be included as an additional component.

<Non-Aqueous Electrolyte Secondary Battery>

Figure 1:
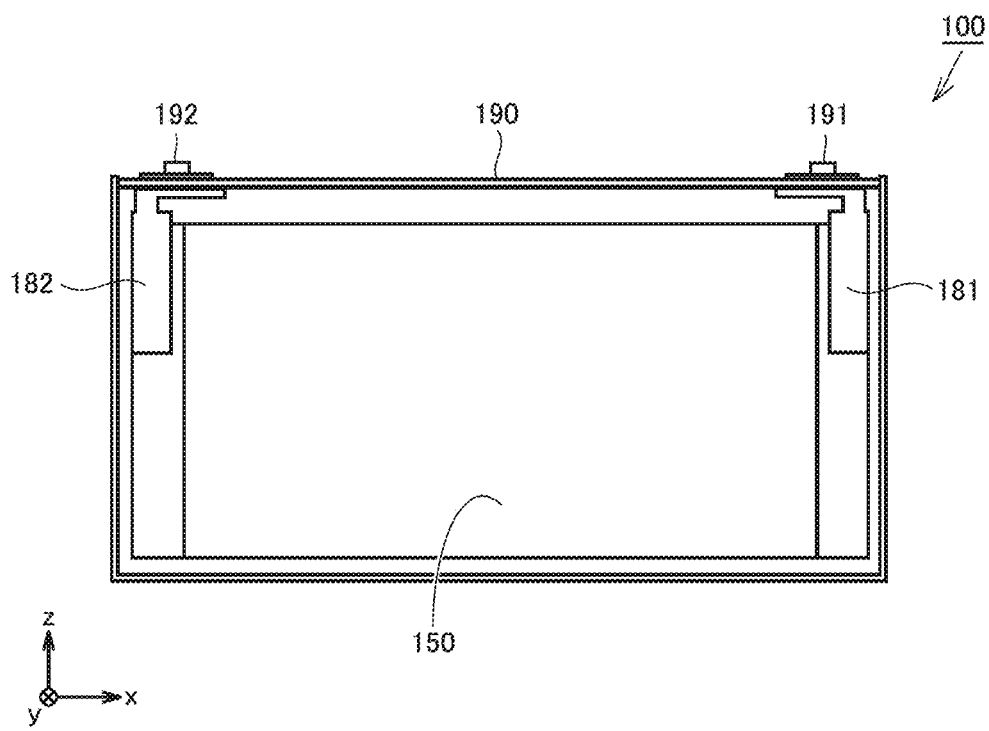
FIG. 1 is a schematic view illustrating an example of a non-aqueous electrolyte secondary battery according to the present embodiment.

FIG. 1 is a schematic view illustrating an example of a non-aqueous electrolyte secondary battery according to the present embodiment.

A battery 100 may be used for any application. For example, battery 100 may be used as a main electric power supply or a motive force assisting electric power supply in an electric vehicle. A plurality of batteries 100 (cells) may be connected together to form a battery module or a battery pack.

Battery 100 includes a housing 190. Housing 190 is prismatic (a flat, rectangular parallelepiped). Housing 190 may be made of an aluminum (Al) alloy, for example. The prismatic shape is merely an example. The housing according to the present embodiment may have any configuration. For example, the housing may be cylindrical or may be a pouch.

Housing 190 accommodates an electrode assembly 150. Electrode assembly 150 is connected to a positive electrode terminal 191 via a positive electrode current-collecting member 181. Electrode assembly 150 is connected to a negative electrode terminal 192 via a negative electrode current-collecting member 182.

Figure 2:
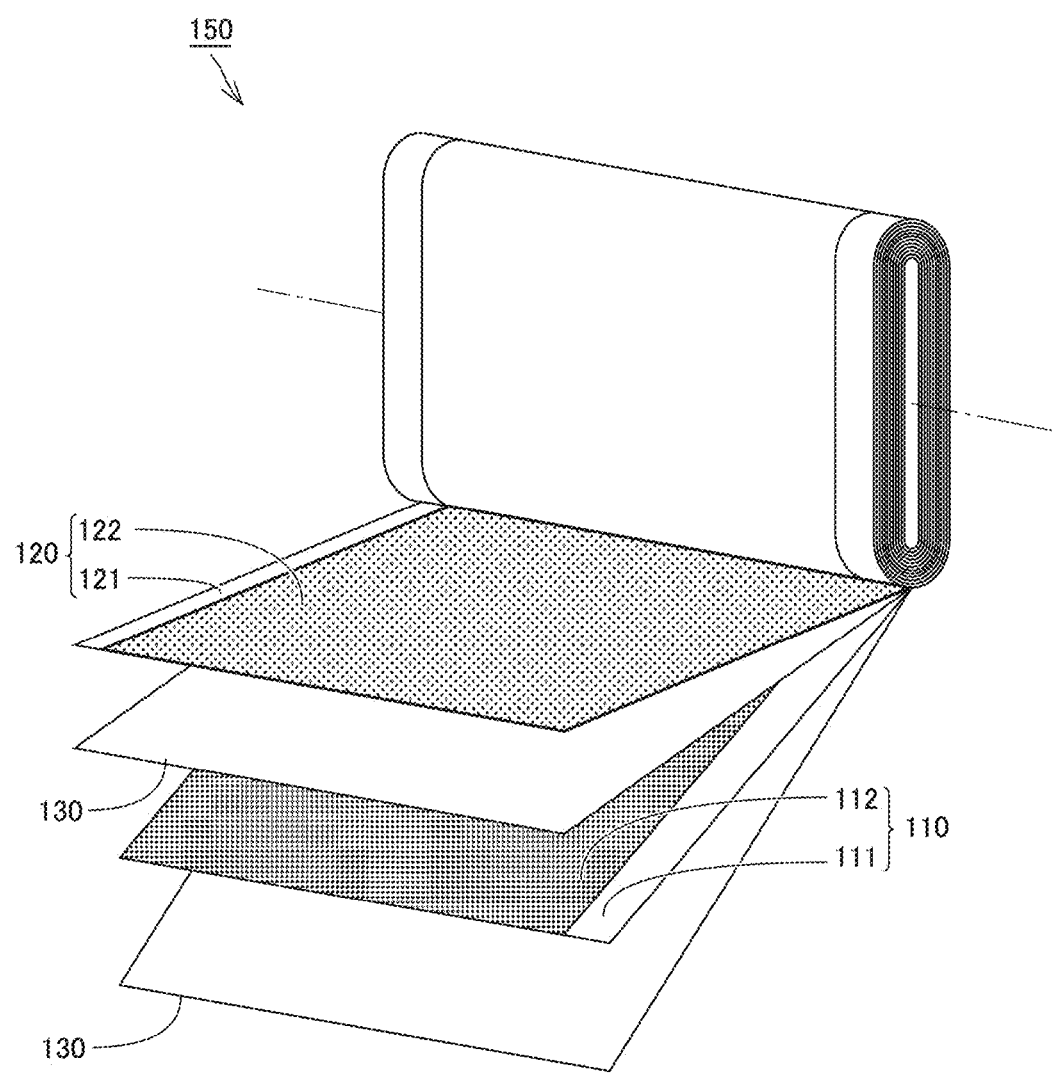
FIG. 2 is a schematic view illustrating an example of an electrode assembly according to the present embodiment.

FIG. 2 is a schematic view illustrating an example of an electrode assembly according to the present embodiment.

Electrode assembly 150 is a wound-type one. Electrode assembly 150 includes a positive electrode 110, a separator 130, and a negative electrode 120. Electrode assembly 150 is impregnated with an electrolyte solution (not illustrated). In other words, battery 100 includes positive electrode 110, negative electrode 120, separator 130, and the electrolyte solution. Each of positive electrode 110, separator 130, and negative electrode 120 is a belt-shaped sheet. Electrode assembly 150 may include two separators 130. Electrode assembly 150 is formed by stacking positive electrode 110, separator 130, and negative electrode 120 in this order and then winding them spirally. After the winding, electrode assembly 150 may be shaped into a flat form. The wound-type one is merely an example. Electrode assembly 150 may be a stack-type one, for example.

<<Negative Electrode>>

Negative electrode 120 includes a negative electrode substrate 121 and a negative electrode active material layer 122. Negative electrode substrate 121 may include a copper (Cu) foil and/or the like, for example. Negative electrode substrate 121 may have a thickness from 5 µm to 30 µm, for example. Negative electrode active material layer 122 is placed on a surface of negative electrode substrate 121. Negative electrode active material layer 122 may be placed on only one side of negative electrode substrate 121. Negative electrode active material layer 122 may be placed on both sides of negative electrode substrate 121. Negative electrode active material layer 122 may be in contact with a surface of negative electrode substrate 121. Between negative electrode active material layer 122 and negative electrode substrate 121, another layer may be interposed. The layer thus interposed may be a conductive layer, an adhesive layer, a PTC (positive temperature coefficient) layer, and/or the like, for example. In the present embodiment, such a configuration in which the interposed layer is present is also regarded as that negative electrode active material layer 122 is placed on a surface of negative electrode substrate 121.

Negative electrode active material layer 122 may have a thickness from 10 µm to 200 µm, for example. Negative electrode active material layer 122 may have a thickness from 50 µm to 150 µm, for example.

Negative electrode active material layer 122 may have a density from 1.05 g/cm³ to 1.3 g/cm³, for example. Negative electrode active material layer 122 may have a density from 1.1 g/cm³ to 1.3 g/cm³, for example.

(Composition)

Negative electrode active material layer 122 includes a negative electrode active material. The negative electrode active material may be powder (particles), for example. The particles of the negative electrode active material may have any shape. The particles may be spherical, flakes, lumps, and/or the like, for example. The negative electrode active material may have a D50 from 0.1 µm to 20 µm, or may have a D50 from 1 µm to 10 µm, or may have a D50 from 1 µm to 3 µm, for example. The "D50" according to the present embodiment refers to a particle size in volume-based particle size distribution at which the cumulative particle volume (accumulated from the side of small particle sizes) reaches 50% of the total particle volume. The D50 may be measured with a laser-diffraction particle size distribution analyzer.

The negative electrode active material may have a BET specific surface area from 1 m²/g to 10 m²/g, or may have a BET specific surface area from 3 m²/g to 5 m²/g, for example. The BET specific surface area is measured by a BET multi-point method.

The negative electrode active material may include an optional component. The negative electrode active material may include, for example, at least one selected from the group consisting of graphite, soft carbon, hard carbon, Si, SiO, Si-based alloy, Sn, SnO, Sn-based alloy, and $Li_4Ti_5O_{12}$. The negative electrode active material may consist essentially of graphite, for example.

In addition to the negative electrode active material, negative electrode active material layer 122 may further include a conductive material, a binder, and the like, for example. The conductive material may include an optional component. The conductive material may include at least one selected from the group consisting of carbon black (such as acetylene black, for example), vapor grown carbon fiber (VGCF), carbon nanotube (CNT), and graphene flake, for example. The amount of the conductive material may be, for example, from 0.1 parts by mass to 10 parts by mass relative to 100 parts by mass of the negative electrode active material. When the negative electrode active material has a sufficient electric conductivity, a conductive material may be not necessary. The binder may include an optional component. The binder may include at least one selected from the group consisting of styrene-butadiene rubber (SBR), carboxymethylcellulose (CMC), and polyacrylic acid (PAA), for example. The amount of the binder may be, for example, from 0.1 parts by mass to 10 parts by mass relative to 100 parts by mass of the negative electrode active material.

(Voids)

Figure 3:
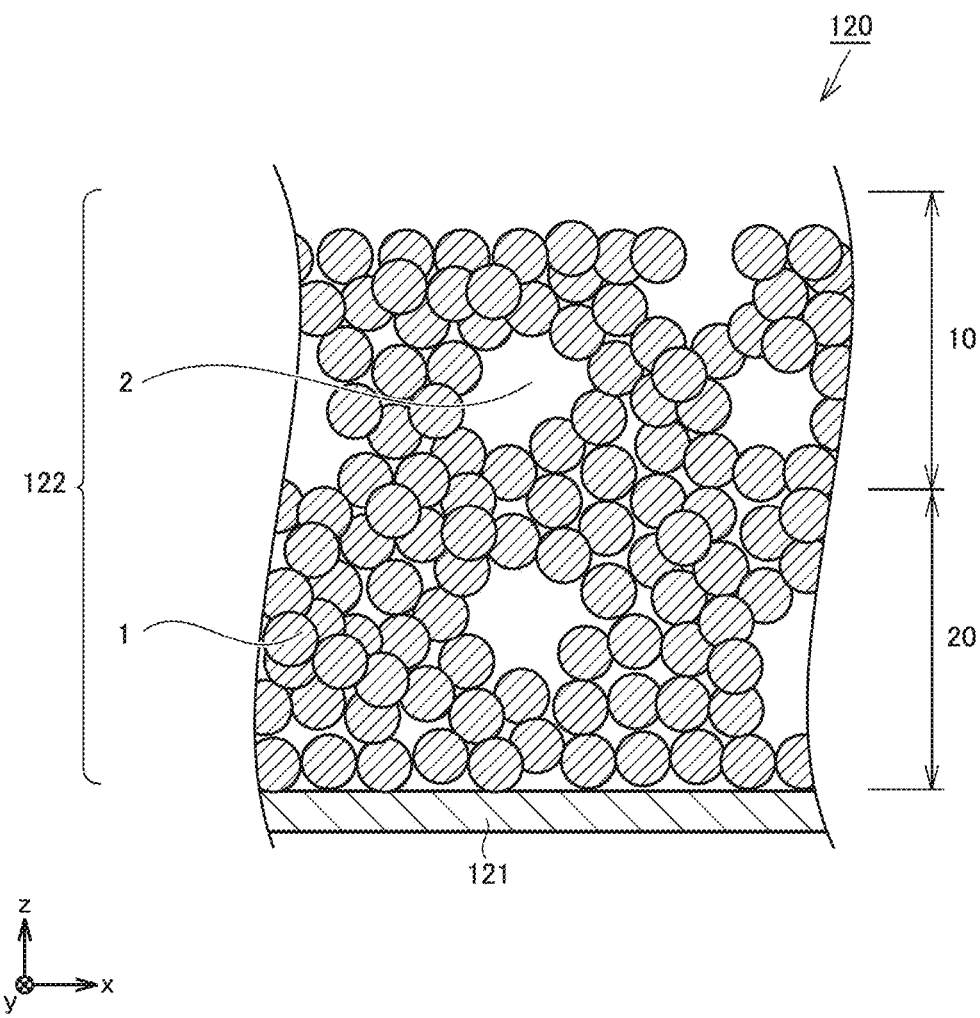
FIG. 3 is a conceptual cross-sectional view illustrating a negative electrode according to the present embodiment.

FIG. 3 is a conceptual cross-sectional view illustrating a negative electrode according to the present embodiment.

FIG. 3 conceptually illustrates a cross section parallel to a thickness direction of negative electrode active material layer 122. In FIG. 3, the thickness direction corresponds to the z-axis direction. Negative electrode active material layer 122 includes a negative electrode active material 1. Voids 2 are formed in negative electrode active material layer 122. Voids 2 have a specific size and a specific shape, and are in a specific amount. Because of this, in the present embodiment, chemically-occurring micro short circuits are expected to be decreased. It may be because metal is deposited inside voids 2 and therefore tends not to grow toward positive electrode 110.

(Average Equivalent Circle Diameter)

Voids 2 have an average equivalent circle diameter from 9.6 μm to 35.8 μm. Voids 2 may have an average equivalent circle diameter from 9.6 μm to 21.5 μm, for example. Voids 2 may have an average equivalent circle diameter from 21.5 μm to 35.8 μm, for example. The average equivalent circle diameter of voids 2 may be greater than the particle size of negative electrode active material 1, for example.

(Average Circularity)

Voids 2 have an average circularity of 0.26 or more. Ideally, the average circularity is 1.00. Voids 2 may have an average circularity of 0.32 or more, for example. Voids 2 may have an average circularity of 0.34 or more, for example. Voids 2 may have an average circularity from 0.26 to 0.34, for example. Voids 2 may have an average circularity from 0.26 to 0.32, for example. Voids 2 may have an average circularity from 0.32 to 0.34, for example.

(Area Percentage)

In a cross section of negative electrode active material layer 122, voids 2 have an area percentage from 3.1% to 30.9%. Voids 2 may have an area percentage of 25.2% or less, for example. When voids 2 have an area percentage of 25.2% or less, an increase in the thickness of negative electrode active material layer 122 during charging tends to be decreased. The higher the area percentage is within the range of 3.1% to 30.9%, the less likely such chemically-occurring micro short circuits are to occur. Voids 2 may have an area percentage of 3.9% or more, or may have an area percentage of 8.8% or more, or may have an area percentage of 11.8% or more, or may have an area percentage of 15.9% or more, for example.

(Method for Measuring Average Equivalent Circle Diameter, Average Circularity, and Area Percentage)

The "average equivalent circle diameter", the "average circularity", and the "area percentage" are measured by the procedure below.

A predetermined cutting tool is used to cut negative electrode 120. Thus, a cross-sectional sample of negative electrode 120 is prepared. Five or more such cross-sectional samples are prepared. The position where each cross-sectional sample is cut is randomly selected from across the entire negative electrode 120.

The cut surface of the cross-sectional sample is cleaned. For example, CP (cross section polisher) treatment, FIB (focused ion beam) treatment, and/or the like may be performed. After cleaning, part of the cross-sectional sample is observed with an SEM (scanning electron microscope). The SEM magnification is adjusted in such a way that two to ten voids, for example, are included within the image. Thus, an SEM image is obtained. An SEM image is obtained from each cross-sectional sample; that is, five or more cross-sectional SEM images are obtained.

Within each cross-sectional SEM image, the areas of individual voids are measured. For example, the area of each void may be measured by counting pixels contained in the void. The pixels may be counted with the use of image analysis software, for example.

The equivalent circle diameter of each void is calculated by the following equation (1):

$$\text{Equivalent circle diameter} = (4s/\pi)^{0.5} \quad (1)$$

[where "s" represents the area of void].

Ten or more voids are randomly selected from each of the five or more cross-sectional SEM images, and for each void, its equivalent circle diameter is measured. The arithmetic mean of the ten or more equivalent circle diameter values is regarded as the average equivalent circle diameter. The average equivalent circle diameter (unit, μm) is significant to one decimal place. It is rounded to one decimal place.

Within each cross-sectional SEM image, the areas of individual voids and the circumferences of individual voids are measured.

The circularity of each void is calculated by the following equation (2):

$$\text{Circularity} = (4\pi s/L^2) \quad (2)$$

[where "s" represents the area of void, and "L" represents the circumference of void].

Ten or more voids are randomly selected from each of the five or more cross-sectional SEM images, and for each void, its circularity is measured. The arithmetic mean of the ten or more circularity values is regarded as the average circularity. The average circularity (a dimensionless amount) is significant to two decimal place. It is rounded to two decimal place.

Within each cross-sectional SEM image, the total area of voids contained in the cross-sectional SEM image and the area of the negative electrode active material layer in the cross-sectional SEM image are measured.

The area percentage of the voids is calculated by the following equation (3):

$$\text{Area percentage} = (S1/S2) \times 100 \quad (3)$$

[where "S1" represents the total area of voids, and "S2" represents the area of the negative electrode active material layer].

For each of the five or more cross-sectional SEM images, the area percentage is measured. The arithmetic mean of the five or more area percentage values is regarded as the area percentage of the subject in question. The area percentage is significant to one decimal place. It is rounded to one decimal place.

(Distribution of Voids)

Voids 2 may be distributed across the entire negative electrode active material layer 122, for example. Voids 2 may be distributed locally, for example. Voids 2 may be distributed in a surface portion of negative electrode active material layer 122, for example. Metal tends to be deposited on a surface portion of negative electrode active material layer 122. When voids 2 are distributed in the surface portion, chemically-occurring micro short circuits are expected to be decreased with high efficiency.

For example, in a cross section parallel to a thickness direction of negative electrode active material layer 122, negative electrode active material layer 122 may be divided into two equal parts in the thickness direction, and thus negative electrode active material layer 122 may be separated into a first region 10 and a second region 20. First region 10 includes a surface of negative electrode active material layer 122. Second region 20 includes an interface between negative electrode active material layer 122 and negative electrode substrate 121. In other words, first region 10 includes a surface portion of negative electrode active material layer 122. Voids 2 may be formed at least in first region 10. The distribution of voids 2 may be checked in a cross-sectional SEM image.

For example, in a cross-sectional SEM image, voids 2 may be present in a region spanning from a surface of negative electrode active material layer 122 to a distance of up to 50 μm. Within this region, metal deposition especially tends to occur. When voids 2 are present in this region, chemically-occurring micro short circuits are expected to be decreased. For example, some of the voids may have apertures in a surface of negative electrode active material layer 122.

For example, the area percentage of voids 2 in first region 10 may be higher than the area percentage of voids 2 in second region 20. When voids 2 are concentrated in first region 10, chemically-occurring micro short circuits are expected to be decreased while a high energy density is achieved, for example. An example of possible configurations is that voids 2 according to the present embodiment are formed in first region 10 and, in second region 20, formation of voids is left to its natural course. Another example of possible configurations is that voids 2 according to the present embodiment are formed in a region spanning from a surface of negative electrode active material layer 122 to a distance of up to 50 μm, and, in a region spanning from a surface of negative electrode active material layer 122 to a distance more than 50 μm, formation of voids is left to its natural course.

(Method of Forming Voids)

As long as voids 2 have the average equivalent circle diameter, the average circularity, and the area percentage as described above, voids 2 may be formed by any method. Voids 2 may be formed with the use of a void-forming aid, for example. As long as it can form voids 2 as desired, any void-forming aid may be used. The void-forming aid may be microcapsules and/or the like, for example.

Figure 4:
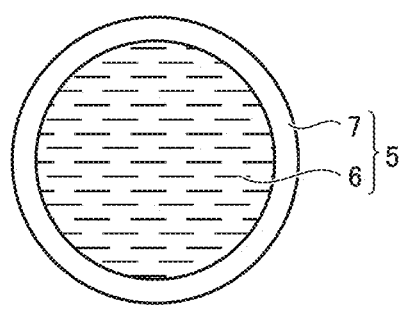
FIG. 4 is a conceptual cross-sectional view illustrating a microcapsule.

FIG. 4 is a conceptual cross-sectional view illustrating a microcapsule.

A microcapsule 5 includes a core 6 and a shell 7. Core 6 may include a volatile material, for example. The volatile material may include a liquid hydrocarbon and/or the like, for example. Core 6 may be hollow, for example. Shell 7 includes a thermoplastic resin material. The thermoplastic resin material may be formed by polymerization of at least one monomer selected from the group consisting of acrylonitrile, methyl acrylate, methyl methacrylate, and polyvinylidene chloride, for example. In the configuration in which core 6 includes the volatile material, when a predetermined temperature is reached, the volatile material generates gas to soften the thermoplastic resin material. This may cause microcapsules 5 to expand. After expanded, microcapsules 5 burst and shrink.

For example, the negative electrode active material, the microcapsules, a binder, and a dispersion medium may be mixed to prepare a negative electrode slurry. The microcapsules may be used in a state before expanded or may be used in a state after expanded. The negative electrode slurry may be applied to a surface of negative electrode substrate 121 and dried to form negative electrode active material layer 122. The microcapsules are heated, and thereby they break and shrink. Thus, voids 2 may be formed in negative electrode active material layer 122. The microcapsules may be heated and shrink at any timing. For example, the microcapsules may shrink before negative electrode active material layer 122 is compressed, or may shrink after negative electrode active material layer 122 is compressed. In the configuration in which voids 2 are formed after negative electrode active material layer 122 is compressed, voids 2 may be formed while a high density of negative electrode active material layer 122 is maintained, for example. The microcapsules may be heated and shrink while the negative electrode slurry is being heated and dried and/or while battery 100 is undergoing thermal aging, for example.

By changing the size, shape, amount, and the like of the microcapsules, for example, the average equivalent circle diameter, the average circularity, and the area percentage of voids 2 may be controlled. When the microcapsules are spherical, for example, voids 2 with a high average circularity are expected to be formed. For example, it is also possible to apply a microcapsule-free negative electrode slurry and a microcapsule-containing negative electrode slurry in a sequential manner so as to localize voids 2 in a surface portion of negative electrode active material layer 122. After the microcapsules shrink, a material derived from the microcapsules (shells) may remain inside voids 2.

<<Positive Electrode>>

Positive electrode 110 includes a positive electrode substrate 111 and a positive electrode active material layer 112. Positive electrode substrate 111 may include an Al foil and/or the like, for example. Positive electrode substrate 111 may have a thickness from 5 μm to 30 μm, for example. Positive electrode active material layer 112 is placed on a surface of positive electrode substrate 111. Positive electrode active material layer 112 may have a thickness from 10 μm to 200 μm, for example.

Positive electrode active material layer 112 may include a positive electrode active material, a conductive material, a binder, and the like, for example. The positive electrode active material may include an optional component. The positive electrode active material may include at least one selected from the group consisting of LiCoO$_2$, LiNiO$_2$, LiMnO$_2$, LiMn$_2$O$_4$, Li(NiCoMn)O$_2$, Li(NiCoAl)O$_2$, and LiFePO$_4$, for example. Here, the expression "(NiCoMn)" in the composition formula "Li(NiCoMn)O$_2$", for example, means that the constituents within the parentheses are collectively regarded as a single unit in the entire composition ratio. The conductive material may include an optional component. The conductive material may include acetylene black and/or the like, for example. The amount of the conductive material may be, for example, from 0.1 parts by mass to 10 parts by mass relative to 100 parts by mass of the positive electrode active material. The binder may include an optional component. The binder may include polyvinylidene difluoride (PVdF) and/or the like, for example. The amount of the binder may be, for example, from 0.1 parts by mass to 10 parts by mass relative to 100 parts by mass of the positive electrode active material.

<<Separator>>

At least part of separator 130 is interposed between positive electrode 110 and negative electrode 120. Separator 130 separates positive electrode 110 from negative electrode 120. Separator 130 is porous. Separator 130 allows permeation of an electrolyte solution therethrough. Separator 130 is electrically insulating. Separator 130 may be made of polyolefin, for example. Separator 130 may have a monolayer structure, for example. Separator 130 may consist essentially of a polyethylene (PE) layer, for example. Separator 130 may have a multilayer structure, for example. Separator 130 may include a polypropylene (PP) layer, a PE layer, and a PP layer, for example. The PP layer, the PE layer, and the PP layer may be stacked in this order. Further, a ceramic layer and/or the like may be formed on a surface of separator 130, for example.

<<Electrolyte Solution>>

The electrolyte solution is a liquid electrolyte. The electrolyte solution includes a solvent and a supporting electrolyte. The electrolyte solution may further include an optional additive. The solvent is aprotic. The solvent may include at least one selected from the group consisting of ethylene carbonate (EC), propylene carbonate (PC), ethyl methyl carbonate (EMC), dimethyl carbonate (DMC), and diethyl carbonate (DEC), for example. The supporting electrolyte is dissolved in the solvent. The supporting electrolyte may include an optional component. The supporting electrolyte may include, for example, at least one selected from the group consisting of LiPF$_6$, LiBF$_4$, and LiN(FSO$_2$)$_2$. The supporting electrolyte may have a concentration from 0.5 mol/L to 2.0 mol/L, for example.

Examples

Next, examples according to the present disclosure (hereinafter also called "the present example") will be described. It should be noted that the below description does not limit the scope of claims.

<Preparation of Positive Electrode>
The below materials were prepared.
Positive electrode active material: Li(NiCoMn)O$_2$
Conductive material: acetylene black
Binder: PVdF
Dispersion medium: N-methyl-2-pyrrolidone (NMP)
Positive electrode substrate: Al foil
The positive electrode active material, the conductive material, the binder, and the dispersion medium were mixed to prepare a positive electrode slurry. The solid matter ratio was "(positive electrode active material)/(conductive material)/binder=90.3/7/2.7" (mass ratio). The positive electrode slurry was applied to the surface (both sides) of the positive electrode substrate, followed by drying, and thereby a positive electrode active material layer was formed. The positive electrode active material layer was compressed. In this way, a positive electrode raw sheet was fabricated.

<Fabrication of Negative Electrode>
The below materials were prepared.
Negative electrode active material: graphite
Binder: CMC, SBR
Dispersion medium: water
Negative electrode substrate: Cu foil
The negative electrode active material, the binder, microcapsules, and the dispersion medium were mixed to prepare a negative electrode slurry. The solid matter ratio was "(negative electrode active material)/CMC/SBR=99/0.6/0.4" (mass ratio). The negative electrode slurry was applied to the surface (both sides) of the negative electrode substrate, followed by drying, and thereby a negative electrode active material layer was formed. The negative electrode active material layer was compressed. In this way, a negative electrode raw sheet was fabricated.

The size, amount, and the like of the microcapsules were changed to fabricate negative electrode raw sheets for No. 1 to No. 15 as specified in Table 1 below. For each of the negative electrode raw sheets for No. 1 to No. 15, the average equivalent circle diameter, the average circularity, and the area percentage were measured according to the procedure described above.

For No. 1, no microcapsules were used. In other words, formation of voids for No. 1 was left to its natural course. In a cross section of No. 1, voids (complex pores) were formed along the grain boundaries of the particles (the negative electrode active material). For No. 1, it was difficult to determine the average equivalent circle diameter, the average circularity, and the area percentage of the voids. For No. 1, a mercury porosimetry method was employed to measure the median pore size and the porosity. No. 2 was fabricated in the same manner as for No. 1 except that the density of the negative electrode active material layer was changed.

Figure 5:
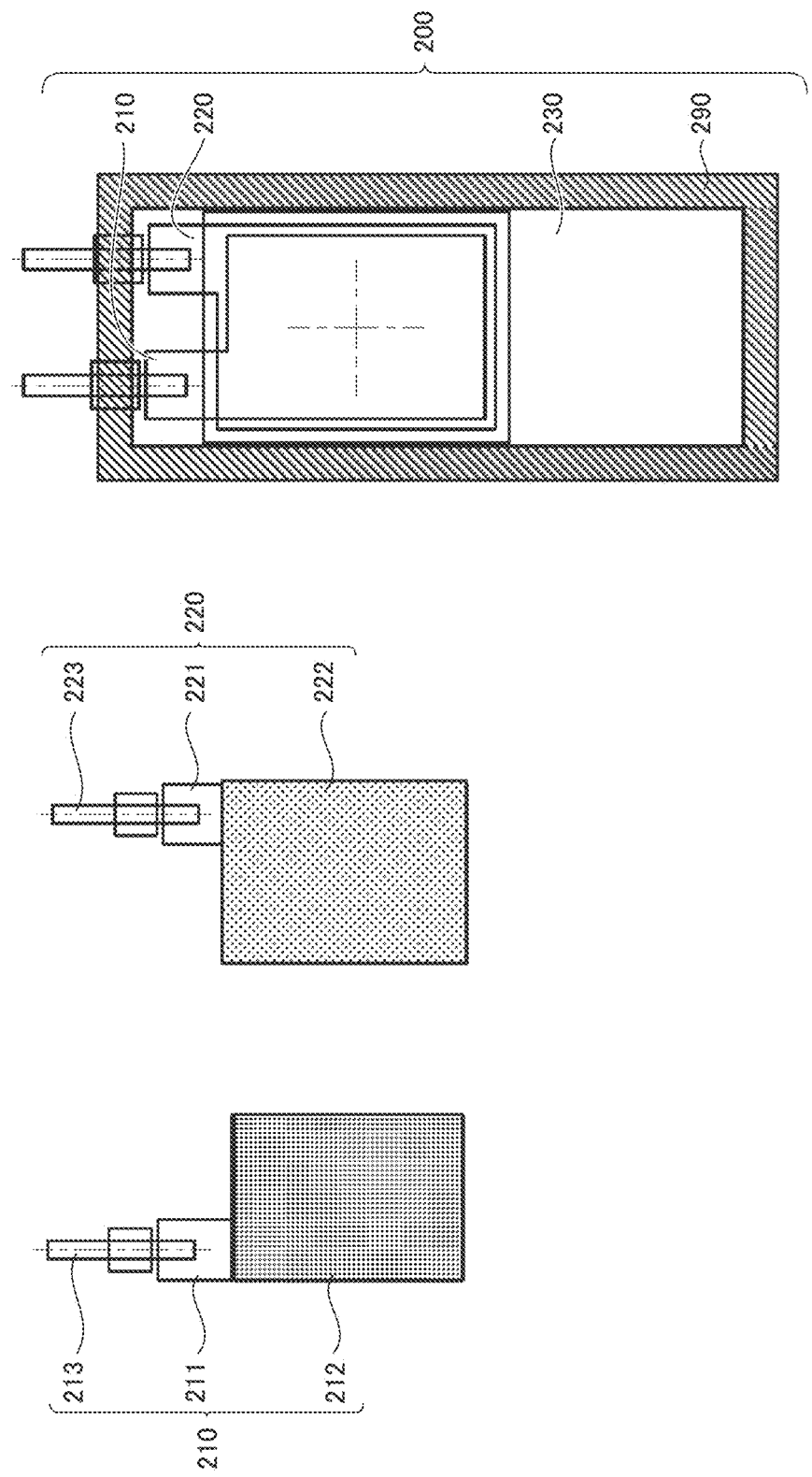
FIG. 5 is a schematic view illustrating the procedure to fabricate a first test cell.

<Preparation of Electrolyte Solution>
An electrolyte solution was prepared. The electrolyte solution had the composition described below. The ratio of the components of the solvent is based on volume at 25° C. and 1 atmospheric pressure.
Solvent: "EC/DMC/EMC=25/35/40 (volume ratio)"
Supporting electrolyte: LiPF$_6$ (concentration, 1.15 mol/L)
<Preparation of Separator>
A separator was prepared. The separator had a multilayer structure. The separator included a PP layer and a PE layer. The separator was cut into a predetermined planar size.
<Fabrication of First Test Cell>
FIG. 5 is a schematic view illustrating the procedure to fabricate a first test cell.

The positive electrode raw sheet fabricated in the above-described manner was cut to form a positive electrode 210. The planar shape of positive electrode 210 was a flag-like shape. Positive electrode 210 included a positive electrode substrate 211 and a positive electrode active material layer 212. Positive electrode active material layer 212 had planar dimensions of 38 mm in length and 27 mm in width. Part of positive electrode substrate 211 was exposed from positive electrode active material layer 212. The exposed portion of positive electrode substrate 211 had planar dimensions of 12 mm in length and 10 mm in width. To this portion, a positive electrode lead tab 213 was bonded by ultrasonic bonding. Positive electrode lead tab 213 was made of Al.

The negative electrode raw sheet fabricated in the above-described manner was cut to form a negative electrode 220. The planar shape of negative electrode 220 was a flag-like shape. Negative electrode 220 included a negative electrode substrate 221 and a negative electrode active material layer 222. Negative electrode active material layer 222 had planar dimensions of 41 mm in length and 30 mm in width. Part of negative electrode substrate 221 was exposed from negative electrode active material layer 222. The exposed portion of negative electrode substrate 221 had planar dimensions of 10 mm in length and 10 mm in width. To this portion, a negative electrode lead tab 223 was bonded by ultrasonic bonding. Negative electrode lead tab 223 was made of nickel (Ni).

Positive electrode 210, a separator 230, and negative electrode 220 were stacked in such a manner that separator 230 was interposed between positive electrode 210 and negative electrode 220. Thus, a stack-type electrode assembly 250 was formed. While electrode assembly 250 was being formed, a Cu particle (diameter, 30 μm) was placed between positive electrode 210 and separator 230. The Cu particle was intended to simulate a metal fragment that can be trapped during battery production.

A housing 290 was prepared. Housing 290 was made of an aluminum-laminated film. Electrode assembly 250 was placed in housing 290. The electrolyte solution was injected into housing 290. After the electrolyte solution was injected, housing 290 was hermetically sealed. In this way, a first test cell 200 was fabricated. First test cell 200 had planar sizes of 100 mm in length and 45 mm in width.

<Micro Short Circuit Test>

In an environment at a temperature of 25° C., the SOC (state of charge) of first test cell 200 was adjusted to 8%. After the SOC adjustment, first test cell 200 was left still standing for 12 hours in an environment at a temperature of 25° C. In this test, it is expected that the Cu particle is dissolved in the electrolyte solution on the positive electrode side and Cu is deposited on the negative electrode and, thereby, a micro short circuit occurs and causes a voltage drop. The amount of voltage drop from the start of the still standing was measured so as to check if a micro short circuit occurred. Ten first test cells 200 were fabricated for each of No. 1 to No. 15, and individual cells were tested for a micro short circuit. The total incidence of micro short circuits was divided by ten, and thus the incidence rate of micro short circuits (percentage) was calculated. The incidence rate of micro short circuits is listed in Table 1 below. It is considered that, the lower the incidence rate of micro short circuits is, the more decreased the chemically-occurring micro short circuits are.

<Fabrication of Second Test Cell>

Figure 6:
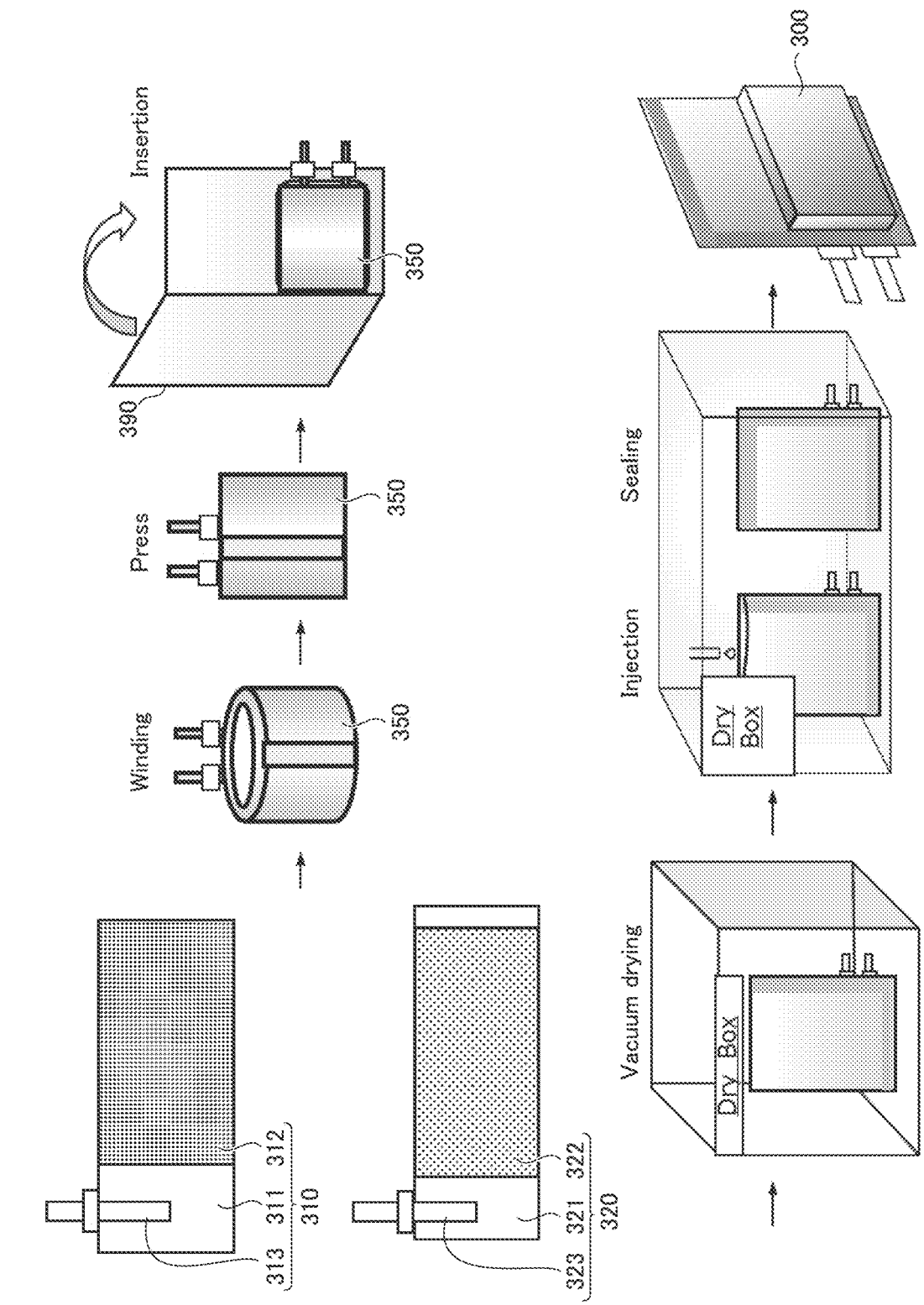
FIG. 6 is a schematic view illustrating the procedure to fabricate a second test cell.

FIG. 6 is a schematic view illustrating the procedure to fabricate a second test cell.

The positive electrode raw sheet fabricated in the above-described manner was cut to form a positive electrode 310. The planar shape of positive electrode 310 was a belt-like shape. Positive electrode 310 had planar dimensions of 50 mm in width and 230 mm in length. Positive electrode 310 included a positive electrode substrate 311 and a positive electrode active material layer 312. Part of positive electrode substrate 311 was exposed from positive electrode active material layer 312. To the exposed portion of positive electrode substrate 311, a positive electrode lead tab 313 was bonded by ultrasonic bonding. The position where positive electrode lead tab 313 was bonded was at a distance of 7 mm from one end in a longitudinal direction.

The negative electrode raw sheet fabricated in the above-described manner was cut to form a negative electrode 320. The planar shape of negative electrode 320 was a belt-like shape. Negative electrode 320 had planar dimensions of 52 mm in width and 330 mm in length. Negative electrode 320 included a negative electrode substrate 321 and a negative electrode active material layer 322. Part of negative electrode substrate 321 was exposed from negative electrode active material layer 322. To the exposed portion of negative electrode substrate 321, a negative electrode lead tab 323 was bonded by ultrasonic bonding. The position where negative electrode lead tab 323 was bonded was at a distance of 18 mm from one end in a longitudinal direction.

Positive electrode 310, a separator (not illustrated), and negative electrode 320 were stacked in this order and then wound spirally to form a wound electrode assembly 350. Positive electrode lead tab 313 and negative electrode lead tab 323 were on the outer circumference of electrode assembly 350. After the winding, electrode assembly 350 was shaped into a flat form. A housing 390 was prepared. Housing 390 was made of an aluminum-laminated film. Into housing 390, electrode assembly 350 was inserted. After insertion, the work (housing 390 and electrode assembly 350) was transferred into a dry box. The work was vacuum dried. After vacuum drying, the electrolyte solution was injected into housing 390. After the electrolyte solution was injected, housing 390 was hermetically sealed. In this way, a second test cell 300 was fabricated.

<Measurement of Cell Thickness>

In an environment at a temperature of 25° C., the SOC of second test cell 300 was adjusted to 50%. After the SOC adjustment, in an environment at a temperature of 25° C., the thickness of the thickest portion of second test cell 300 was measured. This thickness is "cell thickness". The cell thickness was measured with a dial gauge. During measurement, a predetermined pressure was applied to the portion being measured. The cell thickness is listed in Table 1 below. It is considered that the cell thickness reflects the thickness of the negative electrode active material layer during charging.

TABLE 1

| | Negative electrode active material layer | | | | Evaluation | | |
| | Voids | | | | | | |
| No. | Average equivalent circle diameter [μm] | Average circularity [—] | Area percentage [%] | Density [g/cm$^3$] | Incidence rate of micro short circuits [%] | Peeling[3] | Cell thickness [mm] |
|---|---|---|---|---|---|---|---|
| 1 | 1.7[1] | — | 38[2] | 1.2 | 70 | A | 3.50 |
| 2 | — | — | — | 1.0 | 60 | B | 3.61 |
| 3 | 21.5 | 0.23 | 13.2 | 1.2 | 40 | A | 3.57 |
| 4 | 21.5 | 0.23 | 15.9 | 1.2 | 40 | A | 3.58 |
| 5 | 40 | 0.34 | 10.2 | 1.2 | 40 | A | 3.57 |
| 6 | 21.5 | 0.32 | 1.3 | 1.2 | 60 | A | 3.51 |
| 7 | 21.5 | 0.32 | 30.9 | 1.2 | 0 | A | 3.72 |
| 8 | 5.2 | 0.18 | 12.5 | 1.2 | 60 | A | 3.58 |
| 9 | 35.8 | 0.34 | 25.2 | 1.2 | 0 | A | 3.70 |
| 10 | 9.6 | 0.26 | 3.1 | 1.9 | 30 | A | 3.52 |
| 11 | 9.6 | 0.26 | 11.8 | 1.2 | 20 | A | 3.58 |
| 12 | 21.5 | 0.32 | 8.8 | 1.2 | 0 | A | 3.56 |
| 13 | 21.5 | 0.32 | 13.2 | 1.2 | 0 | A | 3.59 |

TABLE 1-continued

| | Negative electrode active material layer | | | | Evaluation | | |
|---|---|---|---|---|---|---|---|
| | Voids | | | | Inci- | | |
| No. | Average equivalent circle diameter [μm] | Average circularity [—] | Area percentage [%] | Density [g/cm³] | dence rate of micro short circuits [%] | Peeling[3] — | Cell thickness [mm] |
| 14 | 21.5 | 0.32 | 15.9 | 1.2 | 0 | A | 3.60 |
| 15 | 35.8 | 0.34 | 3.9 | 1.2 | 30 | A | 3.53 |

[1]The value for No 1 is the median pore size measured by mercury porosimetry.
[2]The value for No 1 is the porosity measured by mercury porosimetry.
[3]"A" indicates that no peeling of the negative electrode active material layer from the negative electrode substrate was observed during test cell fabrication; and "B" indicates that partial peeling of the negative electrode active material layer from the negative electrode substrate was observed during test cell fabrication.

<Results>

As seen in Table 1 above, there is a tendency that the incidence rate of micro short circuits was low when voids satisfied all the following conditions:

Average equivalent circle diameter being from 9.6 μm to 35.8 μm;

Average circularity being 0.26 or more; and

Area percentage being from 3.1% to 30.9%.

When the area percentage was 25.2% or less, the cell thickness tended to be small. It may be because an increase of the thickness of the negative electrode active material layer during charging was decreased.

For No. 1 and No. 2, formation of voids was left to its natural course. A decrease in the density of the negative electrode active material layer resulted in a slight decrease in the incidence rate of micro short circuits. It may be because the porosity was increased. However, for No. 2 with a decreased density, the adhesive force of the negative electrode active material layer decreased, and defects such as partial peeling of the negative electrode active material layer during test cell fabrication were observed.

The present embodiment and the present example are illustrative in any respect. The present embodiment and the present example are non-restrictive. For example, it is expected that certain configurations of the present embodiments and the present examples can be optionally combined. The technical scope defined by the terms of the claims encompasses any modifications within the meaning equivalent to the terms of the claims. The technical scope defined by the terms of the claims also encompasses any modifications within the scope equivalent to the terms of the claims.

What is claimed is:

1. A non-aqueous electrolyte secondary battery comprising:
   a positive electrode;
   a negative electrode;
   a separator; and
   an electrolyte solution, wherein
   at least part of the separator is interposed between the positive electrode and the negative electrode,
   the negative electrode includes a negative electrode substrate and a negative electrode active material layer,
   the negative electrode active material layer is placed on a surface of the negative electrode substrate,
   in a cross section parallel to the thickness direction of the negative electrode active material layer, the negative electrode active material layer is divided into two equal parts in the thickness direction, and thus the negative electrode active material layer is separated into a first region and a second region,
   the first region includes a surface of the negative electrode active material layer,
   the second region includes an interface between the negative electrode active material layer and the negative electrode substrate,
   the negative electrode active material layer includes a plurality of negative electrode active material particles,
   each of the negative electrode active material particles consists of a negative electrode active material,
   voids are formed in the first region of the negative electrode active material layer and in the second region of the negative electrode active material layer,
   an average circularity of the voids in the first region of the negative electrode active material layer is 0.26 or more, and an average circularity of the voids in the second region of the negative electrode active material layer is less than 0.26,
   each of the voids is surrounded by the plurality of negative electrode active material particles, and
   in a cross section parallel to a thickness direction of the negative electrode active material layer,
   the voids have:
   an average equivalent circle diameter from 9.6 μm to 35.8 μm; and
   an area percentage from 3.1% to 30.9%.

2. The non-aqueous electrolyte secondary battery according to claim 1, wherein the voids have an area percentage of 25.2% or less.

3. The non-aqueous electrolyte secondary battery according to claim 1, wherein an average equivalent circle diameter of the voids is greater than a particle size of each of the negative electrode active material particles.

4. The non-aqueous electrolyte secondary battery according to claim 1, wherein each of the negative electrode active material particles includes at least one component selected from the group consisting of graphite, soft carbon, and hard carbon.

5. The non-aqueous electrolyte secondary battery according to claim 1, wherein the negative electrode active material layer further includes copper deposited inside the voids.

6. The non-aqueous electrolyte secondary battery according to claim 1, wherein the voids have an average equivalent circle diameter from 21.5 μm to 35.8 μm.

7. The non-aqueous electrolyte secondary battery according to claim 1, wherein the negative electrode active material layer has a density of from 1.05 g/cm³ to 1.3 g/cm³.

8. The non-aqueous electrolyte secondary battery according to claim 1, wherein the negative electrode active material has a BET specific surface area of from 1 m²/g to 10 m²/g.

9. The non-aqueous electrolyte secondary battery according to claim 1, wherein an area percentage of the voids in the first region is higher than an area percentage of the voids in the second region.

10. The non-aqueous electrolyte secondary battery according to claim 1, wherein the voids have an average equivalent circle diameter from 9.6 μm to 35.8 μm in the first region, and the voids have an average equivalent circle diameter of less than 9.6 μm in the second region.

* * * * *